(12) United States Patent
Randolph et al.

(10) Patent No.: US 7,562,789 B2
(45) Date of Patent: Jul. 21, 2009

(54) CUP ASSEMBLY

(75) Inventors: Ross Steven Randolph, Rockaway, NJ (US); Joseph Paul Sejnowski, North Kingstown, RI (US)

(73) Assignee: Playtex Products, Inc., Westport, CT (US)

( * ) Notice: Subject to any disclaimer, the term of this patent is extended or adjusted under 35 U.S.C. 154(b) by 0 days.

(21) Appl. No.: 10/404,919

(22) Filed: Apr. 1, 2003

(65) Prior Publication Data

US 2003/0218015 A1    Nov. 27, 2003

Related U.S. Application Data

(63) Continuation-in-part of application No. 29/168,356, filed on Oct. 1, 2002, now Pat. No. Des. 476,849, and a continuation-in-part of application No. 09/908,099, filed on Jul. 18, 2001, now Pat. No. 6,607,092, which is a continuation-in-part of application No. 09/645,975, filed on Feb. 4, 2000, now Pat. No. 6,422,415, which is a continuation of application No. 09/019,765, filed on Feb. 6, 1998, now Pat. No. 6,050,445.

(51) Int. Cl.
*A47G 19/22* (2006.01)

(52) U.S. Cl. .................. 220/710.5; 220/212.5; 220/717; 220/714; 264/328.1

(58) Field of Classification Search ............... 220/212.5, 220/710.5, 714, 717, 755, 771; 215/305; 16/411, 421, DIG. 12, 412; 81/177.1; 280/821; D7/510; 74/551.9; 264/328.1
See application file for complete search history.

(56) References Cited

U.S. PATENT DOCUMENTS

| 3,990,596 | A |   | 11/1976 | Hoftman ............... 215/11 R |
| 4,121,731 | A |   | 10/1978 | Okerstrum .............. 220/90.4 |
| 4,828,141 | A |   | 5/1989 | Coy ...................... 220/380 |
| 4,946,062 | A |   | 8/1990 | Coy ...................... 220/90.4 |
| 4,949,457 | A | * | 8/1990 | Burout, III .............. 30/526 |
| D315,212 | S |   | 3/1991 | Oknuki .................. D24/47 |
| D315,213 | S |   | 3/1991 | Ohnuki .................. D24/47 |
| D326,796 | S | * | 6/1992 | Kawano ................. D7/510 |
| D329,355 | S |   | 9/1992 | Yagi ..................... D7/511 |

(Continued)

FOREIGN PATENT DOCUMENTS

EP        0345694        12/1989

(Continued)

OTHER PUBLICATIONS

Gerber's "Fun Grip" Spill-Proof Trainer Cup® pictures (four pages), Dec. 19, 2005.

(Continued)

*Primary Examiner*—Anthony D Stashick
*Assistant Examiner*—James N Smalley
(74) *Attorney, Agent, or Firm*—Ohlandt, Greeley, Ruggiero & Perle, L.L.P.

(57) ABSTRACT

A cup is provided having a lid with a spout defined by walls tapered towards a distal end of the spout. The lid has handles extending therefrom that are preferably formed of a first and second material having different Shore A hardnesses to define a rigid portion and a gripping portion.

58 Claims, 16 Drawing Sheets

U.S. PATENT DOCUMENTS

| | | | | |
|---|---|---|---|---|
| D341,892 S | | 11/1993 | Yagi | D24/197 |
| 5,475,894 A | * | 12/1995 | Wildforster | 16/430 |
| D368,529 S | | 4/1996 | Allegre | D24/197 |
| 5,529,202 A | | 6/1996 | Shamis | 220/301 |
| 5,706,973 A | * | 1/1998 | Robbins et al. | 220/714 |
| 5,740,586 A | | 4/1998 | Gomas | |
| D397,906 S | | 9/1998 | Briggs et al. | D7/392.1 |
| 5,890,620 A | | 4/1999 | Belcastro | 220/714 |
| D419,029 S | | 1/2000 | Randolph | D7/392 |
| D425,994 S | * | 5/2000 | Hakim | D24/197 |
| D429,443 S | * | 8/2000 | D'Alessio | D7/392.1 |
| D429,959 S | | 8/2000 | Otake | D7/510 |
| 6,102,245 A | | 8/2000 | Haberman | 220/714 |
| 6,105,460 A | * | 8/2000 | Li | 74/551.9 |
| 6,108,869 A | * | 8/2000 | Meessmann et al. | 16/430 |
| 6,116,457 A | | 9/2000 | Haberman | 220/703 |
| D442,435 S | | 5/2001 | Takagi | D7/510 |
| 6,230,923 B1 | | 5/2001 | Hung | 220/703 |
| 6,269,968 B1 | | 8/2001 | Belcastro | 220/714 |
| 6,321,931 B1 | | 11/2001 | Hakim et al. | 220/714 |
| 6,349,451 B1 | * | 2/2002 | Newman et al. | 16/427 |
| D454,642 S | | 3/2002 | Hakim | D24/197 |
| 6,357,620 B1 | | 3/2002 | Hakim | 220/714 |
| 6,386,070 B1 | * | 5/2002 | Hong | 81/20 |
| 6,408,524 B1 | * | 6/2002 | Lai | 30/324 |
| 6,497,007 B2 | * | 12/2002 | Newman et al. | 16/427 |
| D476,849 S | | 7/2003 | Randolph | D7/510 |
| 6,656,054 B2 | * | 12/2003 | Ulrich | 473/201 |
| 6,721,997 B2 | * | 4/2004 | Hua | 16/431 |
| 6,779,235 B2 | * | 8/2004 | Newman et al. | 16/427 |
| 2001/0020623 A1 | | 9/2001 | McDonough et al. | 220/714 |
| 2001/0027956 A1 | | 10/2001 | Bonacorso et al. | 215/11.1 |
| 2003/0192891 A1 | * | 10/2003 | Ziegler | 220/288 |

FOREIGN PATENT DOCUMENTS

| | | | |
|---|---|---|---|
| JP | 56-019648 | | 2/1981 |
| JP | 63-131067 | | 10/1988 |
| JP | 02-119865 | | 5/1990 |
| JP | 2002-002751 | | 1/2002 |
| JP | 2002059936 A | * | 2/2002 |
| JP | 2004-321230 | | 11/2004 |
| JP | 2004321233 A | * | 11/2004 |

OTHER PUBLICATIONS

Japanese Office Action dated Nov. 25, 2008 (including translated document) from corresponding Japanese Application No. 2006-509560.

* cited by examiner

CUP ASSEMBLY

RELATED APPLICATION

This application is a continuation-in-part of, and claims priority in, U.S. Design Application Ser. No. 29/168,356, filed Oct. 1, 2002 now U.S. Pat. No. D,476,849, the disclosure of which is incorporated in its entirety herein by reference. This application is also a continuation-in-part of, and claims priority in, U.S. application Ser. No. 09/908,099, filed Jul. 18, 2001 now U.S. Pat. No. 6,607,092, which is a continuation-in-part of prior U.S. patent application Ser. No. 09/645,975 filed on Feb. 4, 2000 and issued as U.S. Pat. No. 6,422,415, which was a continuation of prior U.S. patent application Ser. No. 09/019,765 filed on Feb. 6, 1998 and issued as U.S. Pat. No. 6,050,445, the disclosures of which are incorporated in their entirety herein by reference.

BACKGROUND OF THE INVENTION

1. Field of the Invention

The present invention relates to cups. More particularly, the present invention relates to infant cup assemblies.

2. Description of the Prior Art

Cups designed especially for use by infants or children are known. Such cups are intended to facilitate the gripping of the cup by the infant. Contemporary devices often employ gripping structures that are formed on the surface of the bottle.

A baby bottle with an outer surface that has been adapted to provide handles intended to allow infants and children to better grip the bottle, is disclosed in U.S. Pat. No. 5,215,203 to Malcolm. The bottle has at least two sets of handles that are formed integrally with the bottle by a plurality of recesses extending vertically along a substantial length of the bottle. The recesses have either side walls that converge towards each other as they extend towards a central longitudinal axis of the bottle or side walls that are parallel to each other. The lobe shaped handles resulting from the converging side walls and the rectangular shaped handles resulting from the parallel side walls, allow an infant or child to partially grasp or hold the handles. The bottles provide limited assistance to infants or children because they do not allow for a complete or nearly complete closure of the infants hands around the handles.

Other cups designed especially for use by infants or children include orifices that are intended to reduce spillage of fluid from the cup. Such cups have drinking orifices and separate air vents, which allow the user to drink from the orifice without creating excessive vacuum in the cup. However, drinking orifices and air vents are liable to leak liquid stored in the cup between feedings, or if dropped during use. Drinking orifices and the surrounding lid structure through which the orifices are disposed, have a lasting effect on the child's lip placement which can impact the child's ability to feed and swallow.

Certain cups have been developed that use valving mechanisms at the orifice and at the air vent. These valves respond to suction generated during feeding to open and allow liquid to pass through the orifice and to allow air to enter the air vent when a vacuum is developed in the interior of the cup. Patents disclosing such valves include U.S. Pat. No. 5,079,013 to Belanger, U.S. Pat. No. 6,422,415 to Manganiello, U.S. Pat. No. 6,050,445 to Manganiello and U.S. Pat. No. RE 37,016 to Morano, which are commonly assigned or licensed to the assignee of the present application. Applicant hereby incorporates the disclosure of these patents by reference.

Accordingly, there is a need for cups having handles, which facilitate gripping and grasping by infants, and motivate infants to use such handles. There is also a need for handles on cups having sufficient strength to withstand use by children. There is a further need for cups having lids and orifices that facilitate use by children, including promoting proper lip closure around the orifice.

SUMMARY OF THE INVENTION

It is an object of the present invention to provide a cup assembly that assists infants and children in holding the cup assembly.

It is another object of the present invention to provide such a cup assembly that promotes better hand-to-mouth coordination.

It is yet another object of the present invention to provide such a cup assembly that promotes independent cup drinking in the child.

It is still another object of the present invention to provide such a cup assembly that reduces or eliminates leakage and spillage.

It is a further object of the present invention to provide such a cup assembly that facilitates use of the spout.

It is another further object of the present invention to provide such a cup assembly that facilitates generation of a suction force and promotes improved flow-rate through the orifice.

It is yet a further object of the present invention to provide such a cup that promotes proper lip closure.

It is still a further object of the present invention to provide such a cup assembly that promotes better lip approximation.

These and other objects and advantages of the present invention are provided by a lid for a cup comprising a lid body removably securable to the cup; an orifice; and a handle having a rigid portion and a gripping portion. The rigid portion is formed from a first material, the gripping portion is formed from a second material, and the first material has a higher Shore A hardness than the second material. The lid body can have a spout with the orifice formed therethrough. The handle can have an upper surface and a lower surface with the gripping portion at least partially covering the upper surface and substantially covering the lower surface.

In another aspect of the invention, a cup assembly for an infant is provided comprising a cup defining an inner volume; a lid having an orifice in fluid communication with the inner volume and the lid being removably securable to the cup; and a handle having a rigid portion and a gripping portion. The rigid portion is formed from a first material, the gripping portion is formed from a second material, and the first and second materials are integrally molded. The first material has a higher Shore A hardness than the second material.

In another aspect of the invention, a cup assembly for an infant is provided comprising a cup defining an inner volume; a lid having an orifice in fluid communication with the inner volume and the lid being removably securable to the cup; and a handle comprising a rigid portion and a gripping portion and having a proximal end and a distal end. The rigid portion is formed from a first material and the gripping portion is formed from a second material. The first material has a higher Shore A hardness than the second material. The proximal end is secured to the lid and the distal end is separated from the cup by a first distance when the lid is secured to the cup. The first distance is large enough to allow a hand of the infant to pass between the cup and the distal end of the handle.

In another aspect of the invention, a cup assembly is provided which comprises a cup defining an inner volume, and a lid having a spout, an orifice and a handle. The orifice is disposed through the spout. The handle has a rigid portion and a gripping portion. The rigid portion has a channel. The rigid portion is formed from at least a first material and the gripping portion is formed from at least a second material. The first material has a higher Shore A Hardness than the second material. A first portion of the second material is disposed in the channel and a second portion of the second material is disposed adjacent to the channel.

In another aspect of the invention, a method of making a handle for a cup assembly is provided. The method comprises molding a rigid portion of the handle from a first material, with the rigid portion having at least one channel formed therein. The method further comprises molding a gripping portion of the handle from a second material, with the gripping portion having at least a first portion disposed in the channel. The first material has a higher Shore A Hardness than the second material.

In another aspect of the invention, a method of making a lid is provided. The method comprises molding a rigid portion of the lid from a first material, with the rigid portion having a lid body, a spout, and a handle. The handle has at least one channel formed therein. The method further comprises molding a gripping portion of the lid from a second material, with the gripping portion having at least a first portion disposed in the channel. The first material has a higher Shore A Hardness than the second material.

The rigid portion can have a channel formed therein, with at least a portion of the second material disposed in the channel. The channel can be first and second channels disposed at least partially along the rigid portion. The rigid portion can have first, second and third walls integrally formed with each other and defining the first and second channels. The first and second walls can be substantially orthogonal to the third wall. The handle can have an upper surface and a lower surface with the first wall of the rigid portion at least partially defining the upper surface, and with the gripping portion at least partially defining the lower surface.

The rigid portion can have a rib disposed along at least one of the first and second channels, and the rib can be substantially parallel with the first and second walls. The rib can be disposed in proximity to the proximal end of the handle. The first wall can have a wave-like shape, with the gripping portion having a corresponding wave-like shape adjacent to the first wall, and substantially defining the lower surface. The third wall can have a projection formed therein, and the second material can be molded over the projection to form a gripping abutment. The gripping abutment can be disposed in proximity to the distal end of the handle.

The first material can be a polypropylene and the second material can be a thermoplastic elastomer. The lid can have a spout and the orifice can be formed in the spout. The lid can have a vent hole formed therein. There can also be a flow control valve in fluid communication with the orifice, the vent hole and the inner volume, wherein the valve limits flow from the inner volume through the orifice. The handle can be a pair of handles extending from the lid and diametrically opposed along the lid. The spout can have an ellipsoidal cross-sectional area. The spout can have a distal end, and can be inwardly tapered toward the distal end. The spout can have a top wall, with the orifice being disposed through the top wall, and with the top wall having an upwardly arcuate or dome-like shape.

The molding of the gripping portion can include disposing a second portion of the second material adjacent to the channel. The molding of the rigid portion can include integrally forming a first wall, a second wall and a third wall, with the third wall connecting the first and second walls. The molding of the rigid portion can include forming a substantially planar bottom surface along the channel.

Other and further objects, advantages and features of the present invention will be understood by reference to the following.

DESCRIPTION OF THE INVENTION

Figure 1:
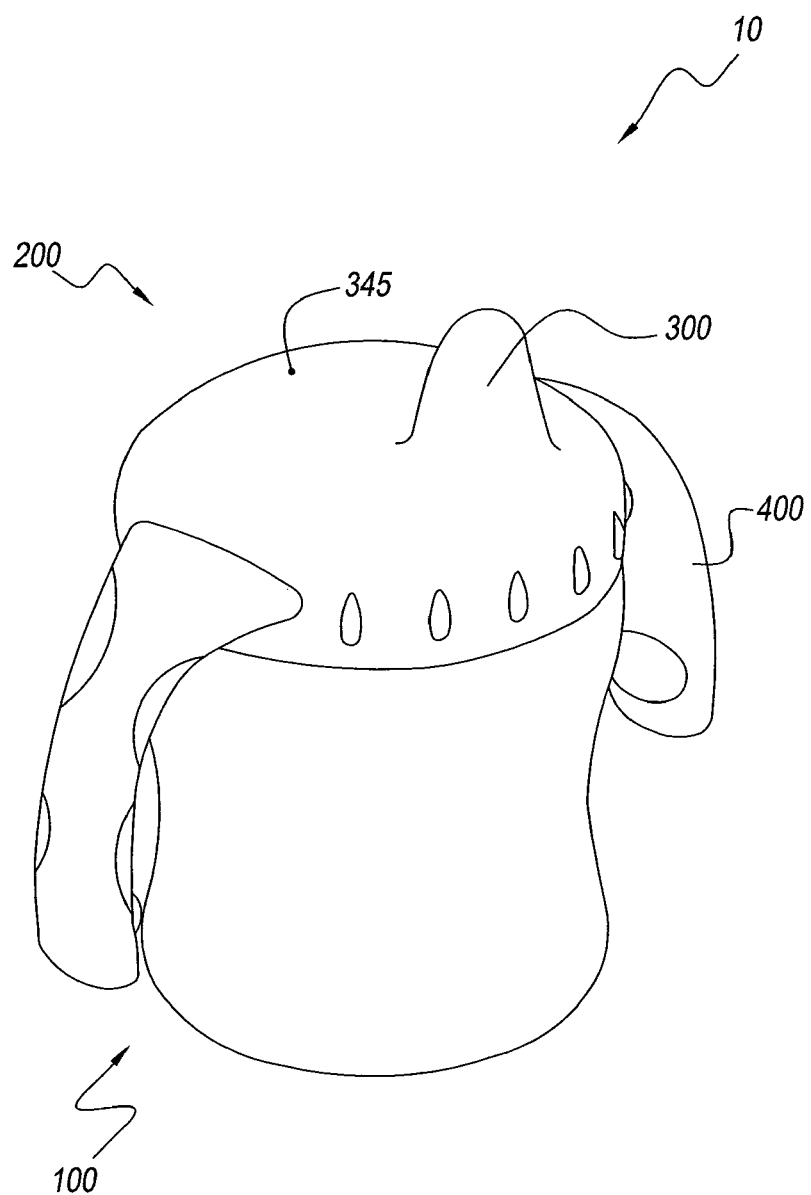
FIG. 1 is a front perspective view of a cup assembly of the present invention.
Figure 2:
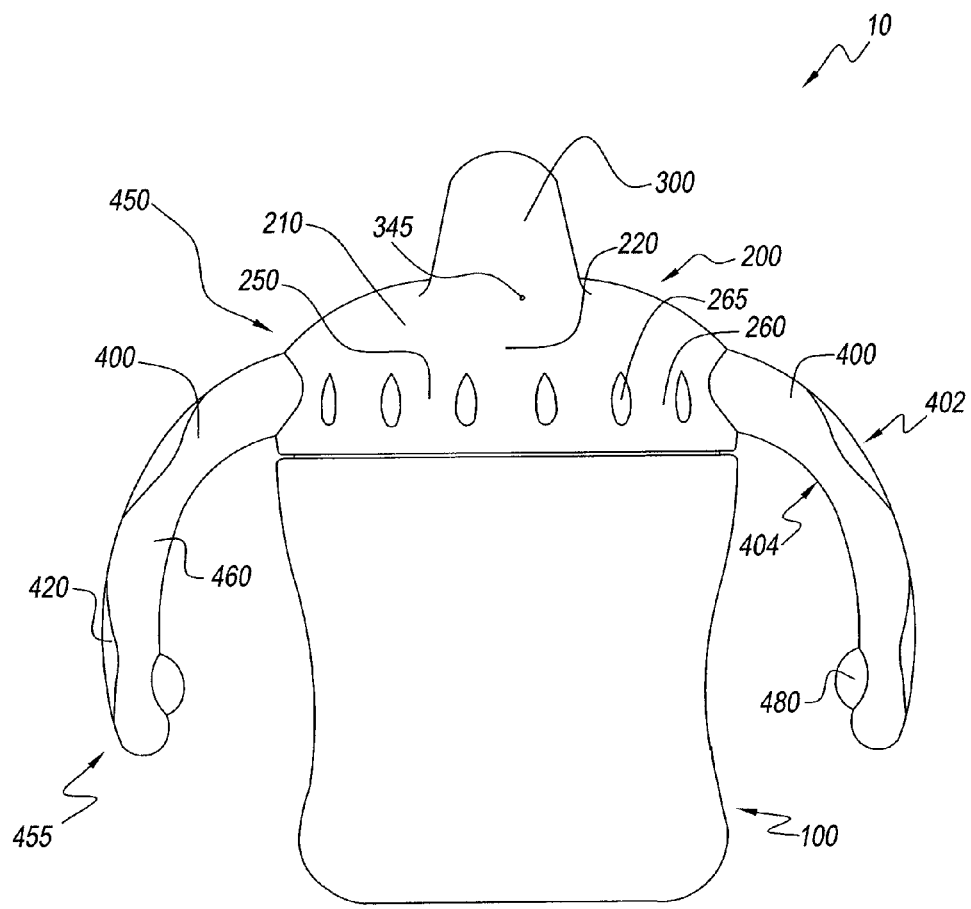
FIG. 2 is a rear view of the cup assembly of FIG. 1.
Figure 3:
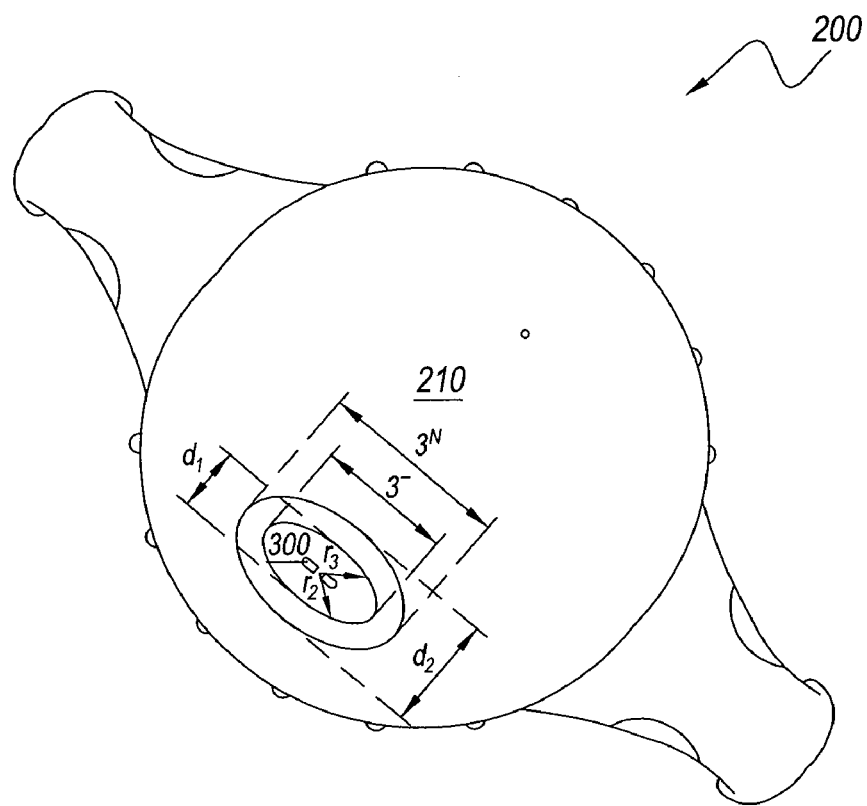
FIG. 3 is a top view of the cup assembly of FIG. 1.
Figure 4:
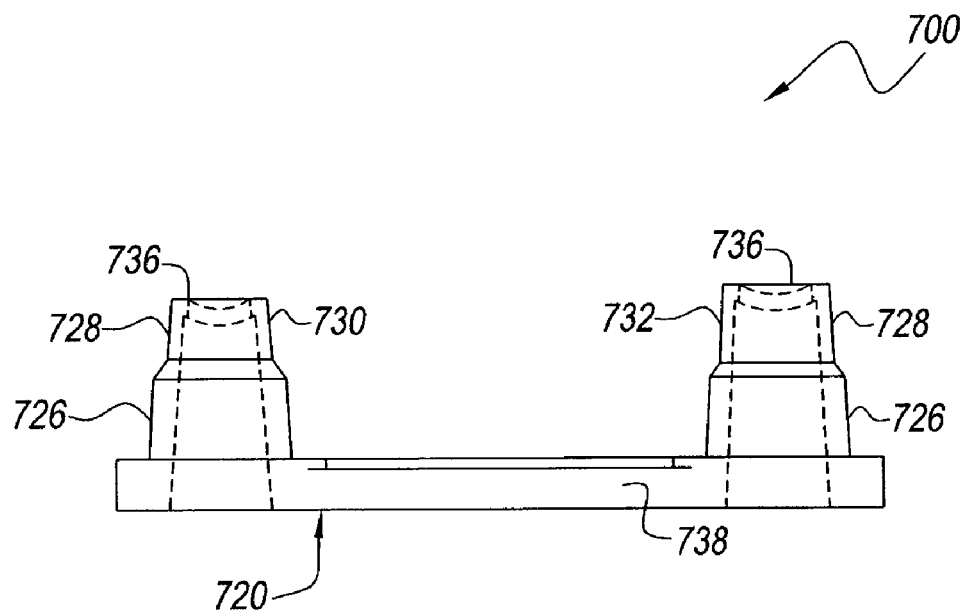
FIG. 4 is a front view of the flow control valve for the cup assembly of FIG. 1.

Referring to the drawings and, in particular, FIGS. 1 through 4, there is shown a preferred embodiment of a cup assembly of the present invention, generally represented by reference numeral 10. Cup assembly 10 has a cup or container 100, a cap or lid 200, a spout 300 extending from the lid, and a valve or flow control element 700 (FIG. 4).

Figure 5:
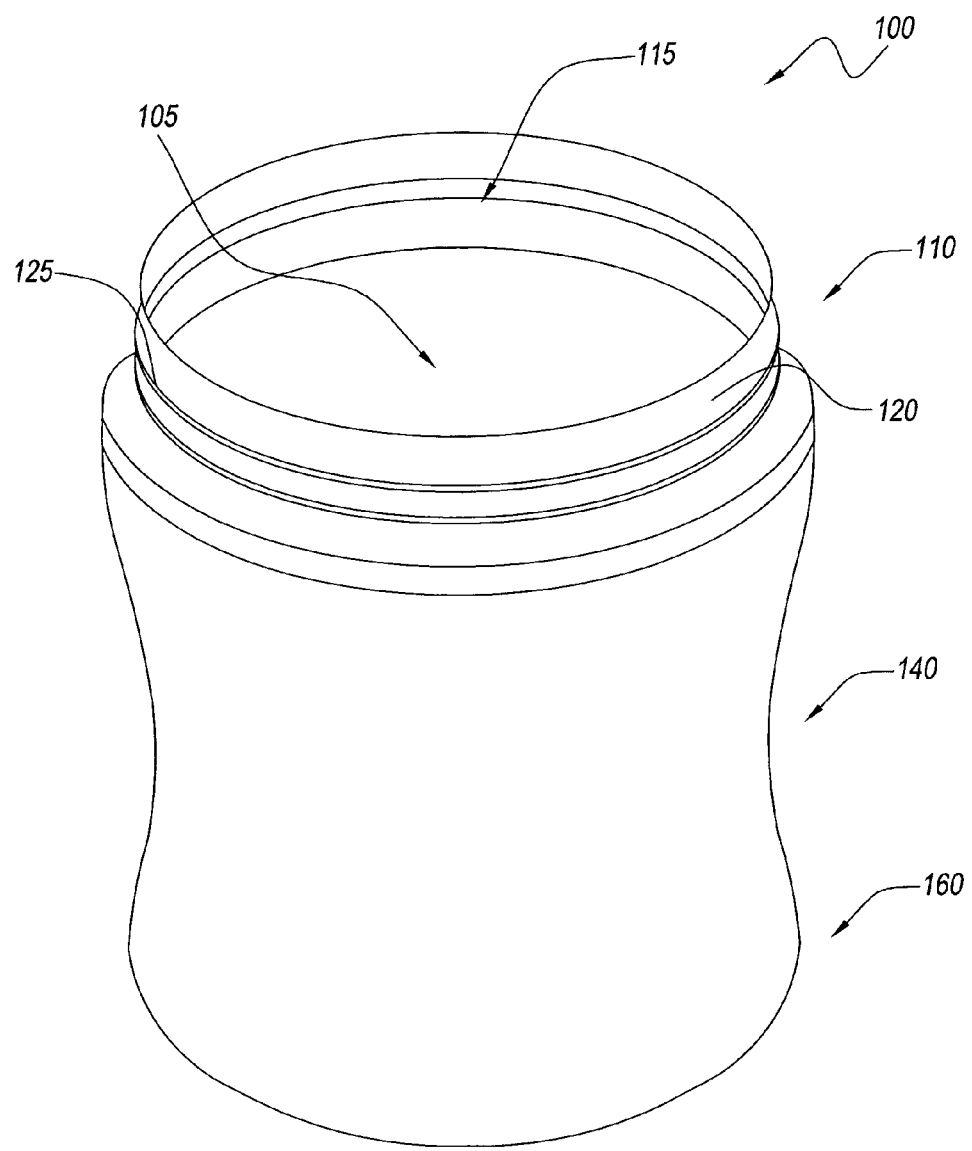
FIG. 5 is a top perspective view of the cup of FIG. 1.
Figure 6:
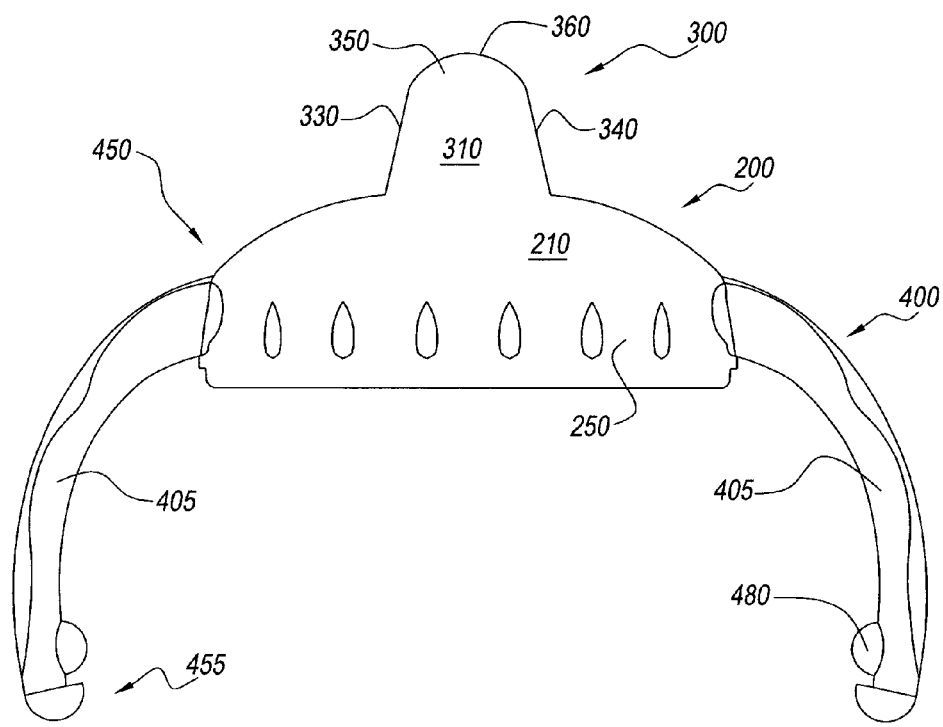
FIG. 6 is a front view of the lid of FIG. 1.
Figure 7:
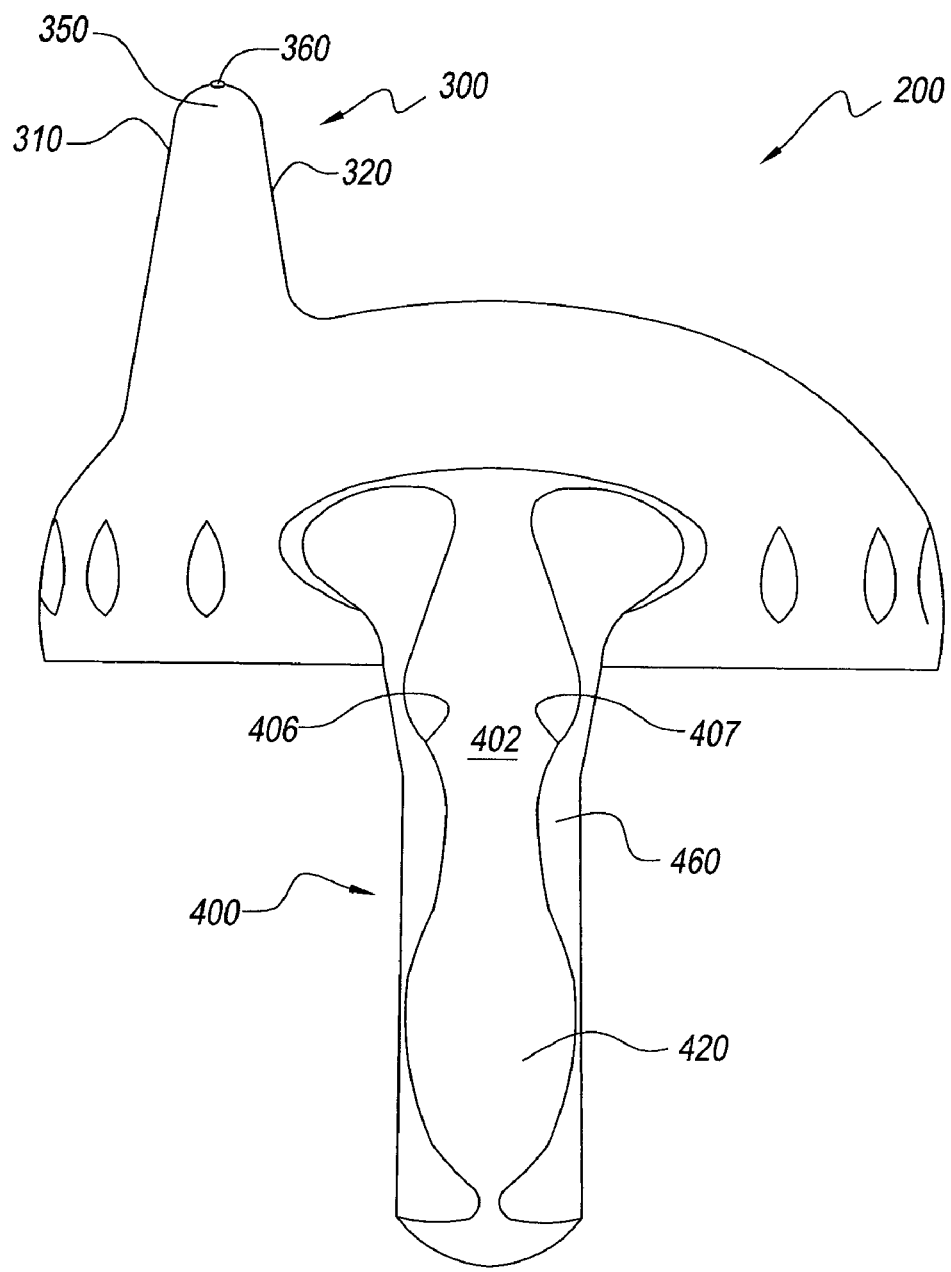
FIG. 7 is a side view of the lid of FIG. 1.
Figure 8:
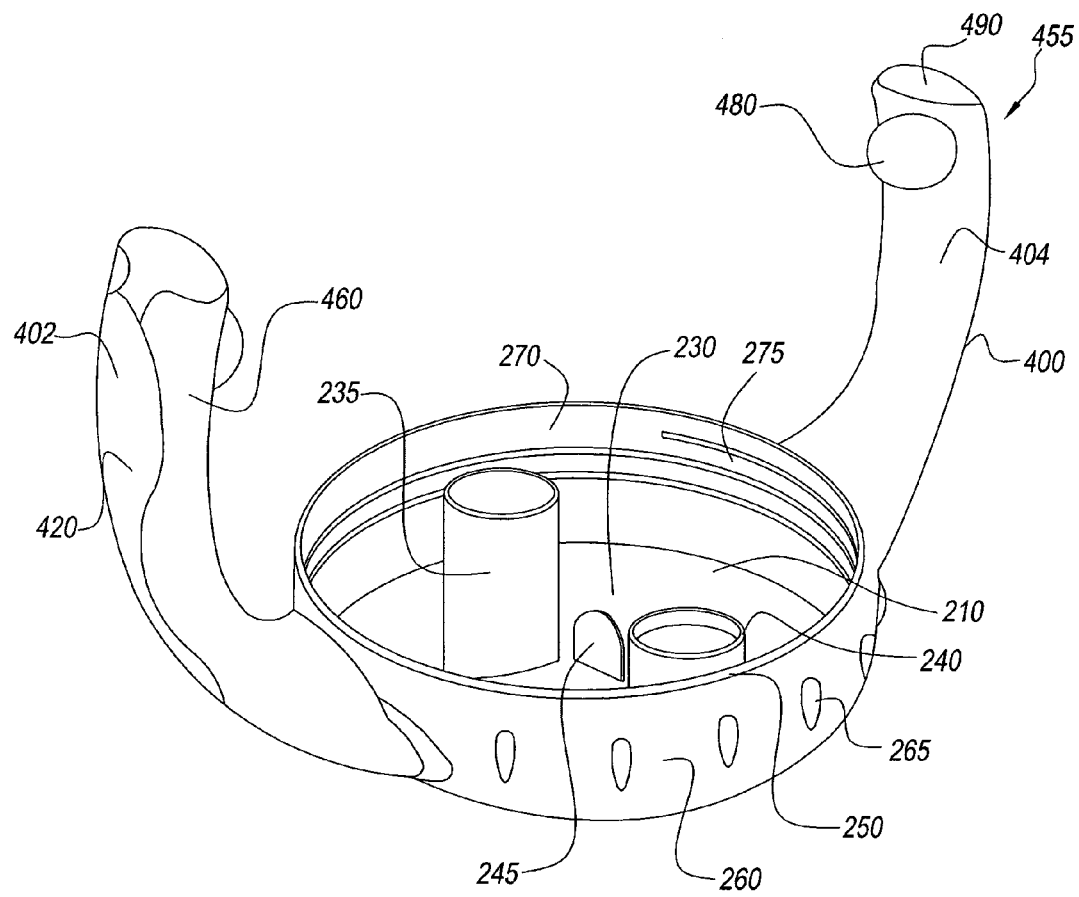
FIG. 8 is a bottom perspective view of the lid of FIG. 1.
Figure 9:
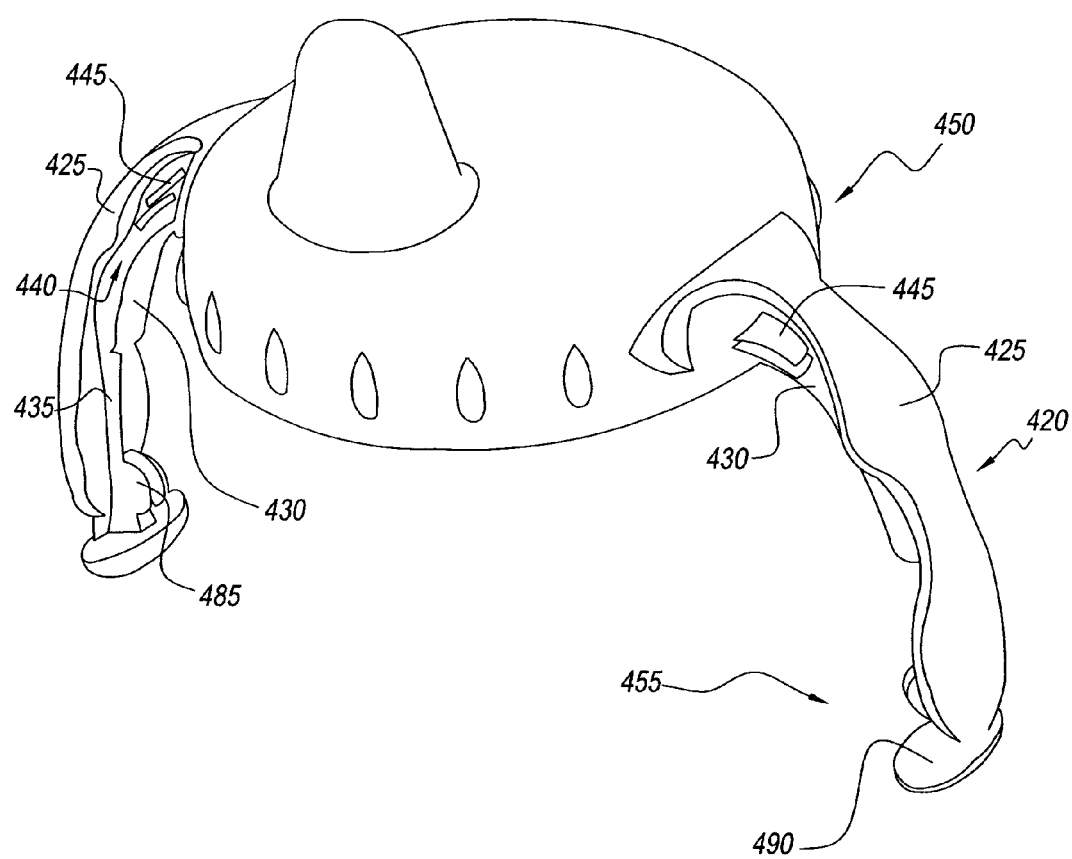
FIG. 9 is a front perspective view of the lid of FIG. 8 without a gripping portion.
Figure 10:
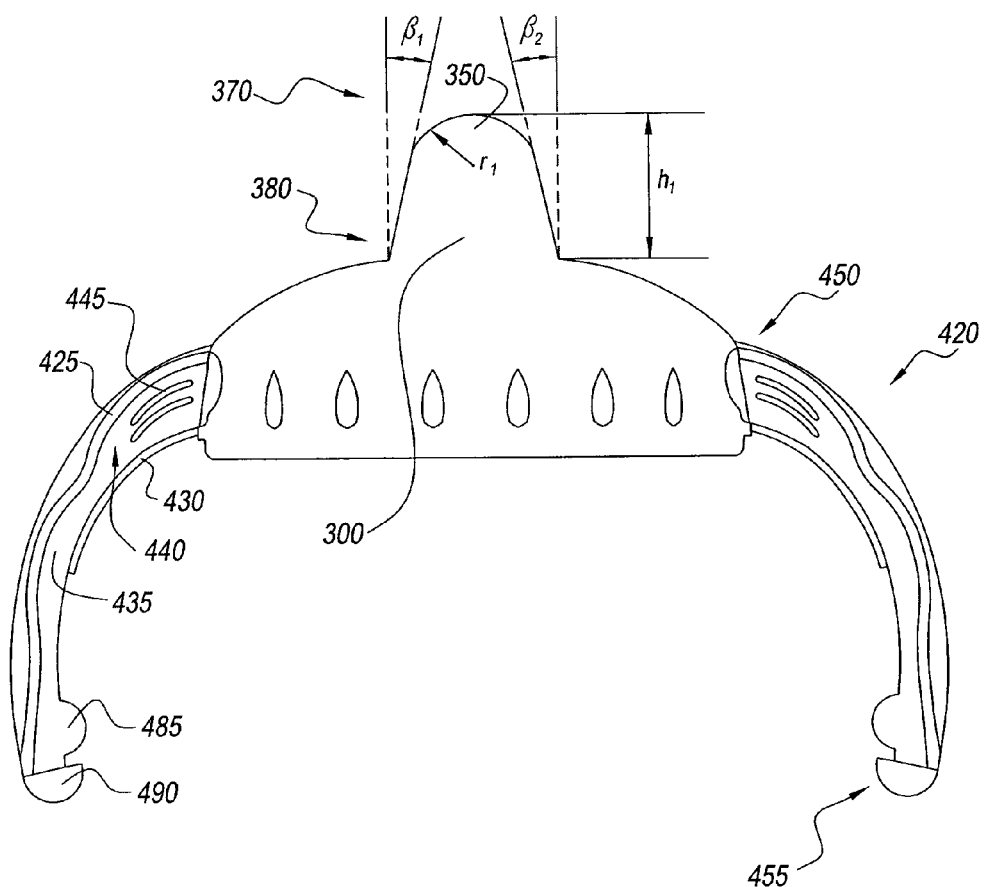
FIG. 10 is a front view of the lid of FIG. 9 without the gripping portion.
Figure 11:
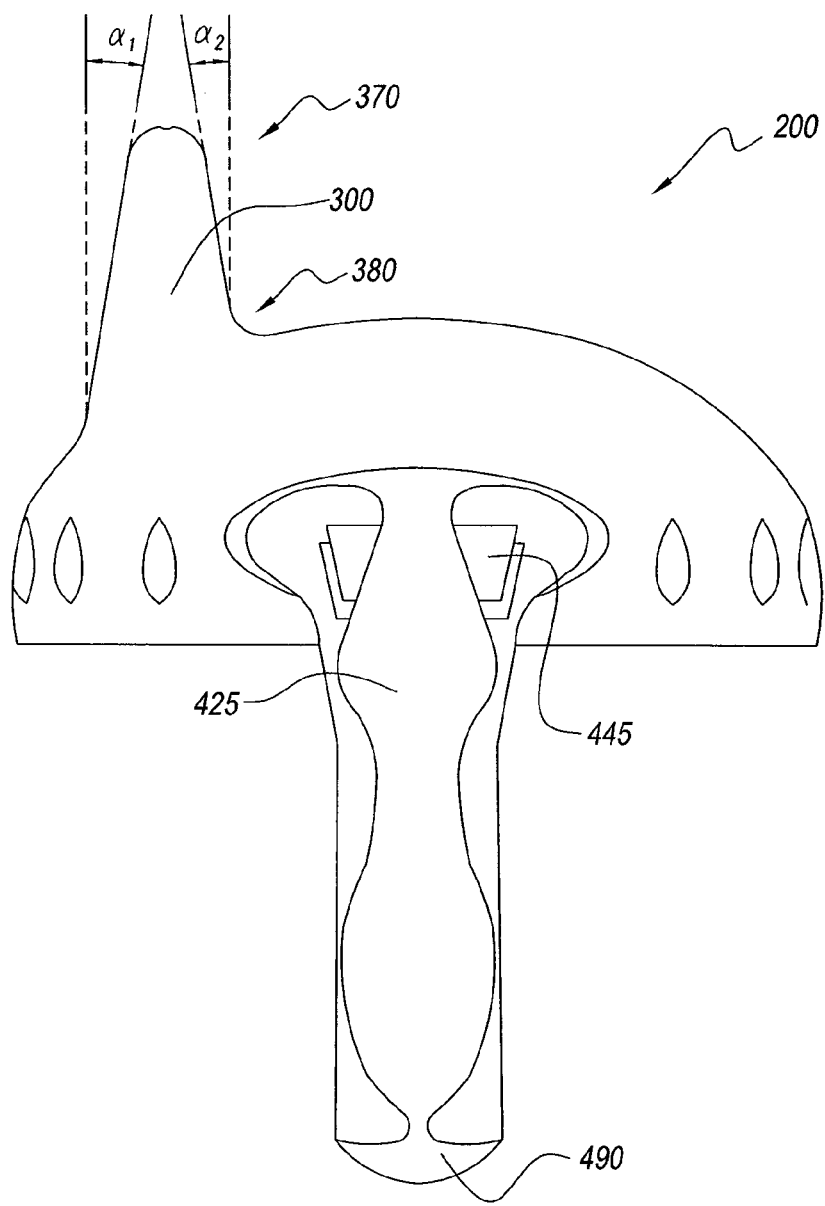
FIG. 11 is a side view of the lid of FIG. 9 without the gripping portion.
Figure 12:
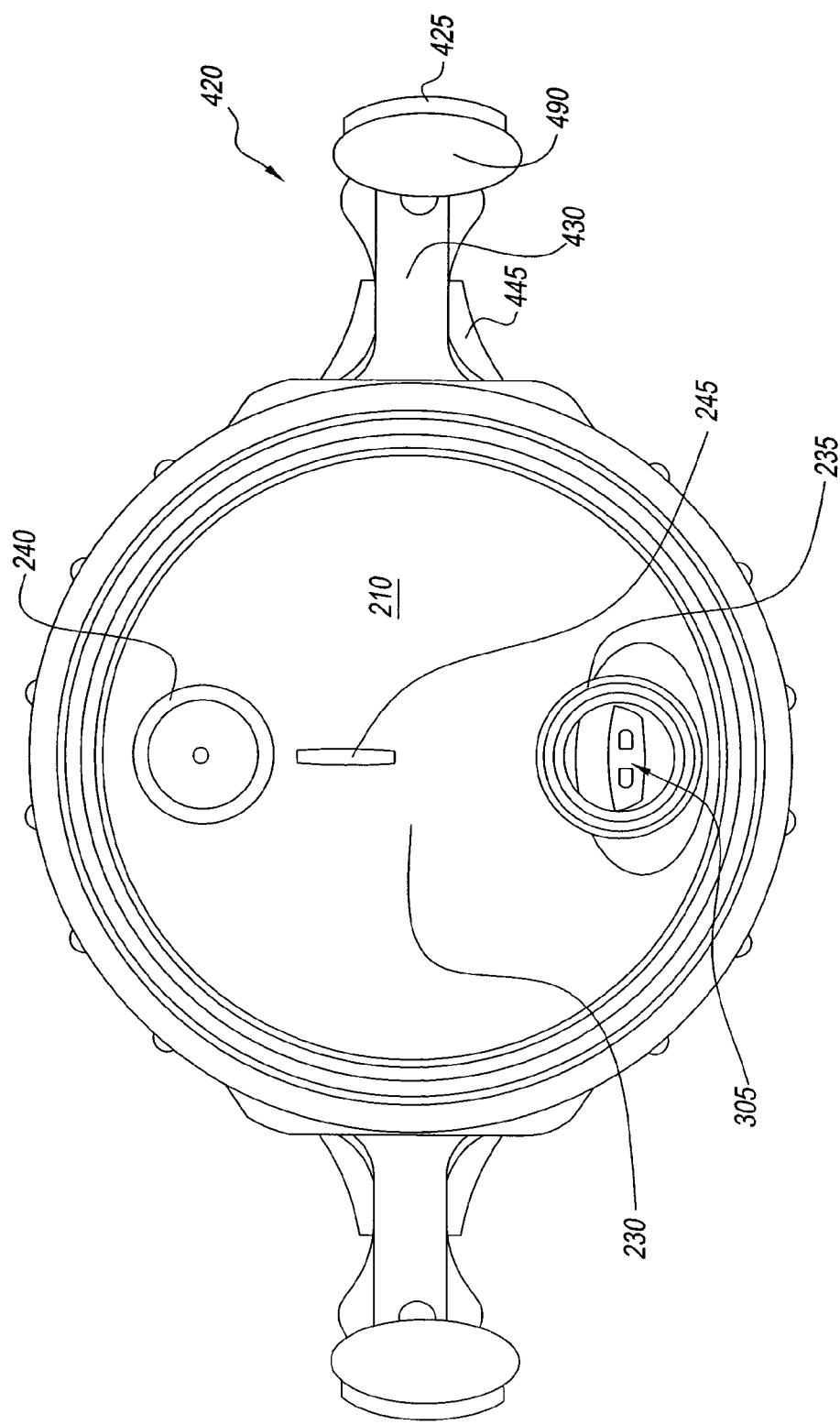
FIG. 12 is a bottom view of the lid of FIG. 9 without the gripping portion.

Referring to FIG. 5, cup 100 has a substantially cylindrical shape defining an inner volume 105. Cup 100 has a top portion 110 having an open end 115, a middle portion 140 and a bottom portion 160. Middle portion 140 can have a diameter that is smaller than the diameter of top portion 110 or bottom portion 160 to provide an hour-glass like shape. Alternative shapes can also be used for cup 100, such as, for example, tapered.

Top portion 110 has an outer surface 120 with threads 125 formed thereon. The preferred embodiment has threads 125 for removably engaging lid 200 with cup 100. However, alternative engagement structures or methods can also be used to engage lid 200 with cup 100, such as, for example, a snap fit. Cup 100 is preferably transparent or semitransparent, which provides for visual indication of the contents and amount within the cup, and also can encourage or promote use by a child through visual stimulation. Cup 100 can also be opaque.

Referring to FIGS. 1 through 8, lid 200 has a center member or lid body 210, an annular flange 250, spout 300 (which will be described later in greater detail), an air vent 345 and handles 400. Center member 210 has an upper surface 220 and a lower surface 230. Preferably, center member 210 has a circular shape. More preferably, center member 210 has an upwardly convex or dome-like shape. However, alternative shapes can also be used for center member 210, such as, for example, flat or concave. Annular flange 250 extends downwardly from the outer circumference of center member 210 to provide a sealing or mating surface between lid 200 and cup 100.

Annular flange 250 has an outer surface 260 and an inner surface 270. Outer surface 260 preferably has gripping structures 265 secured thereto. In the preferred embodiment, gripping structures 265 are a number or series of tear-drop shaped projections formed integrally with outer surface 260 of flange 250. Preferably, gripping structures 265 are equi-distantly spaced apart. Alternative shapes, designs and/or patterns for gripping structures 265 can also be used to facilitate removable engagement of lid 200 with cup 100, such as, for example, bubbles or wave-like grooves or ridges. Inner surface 270 has threads 275 secured thereto. Threads 275 mate with threads 125 of cup 100 to removably engage the cup with the lid 200. However, as described above, alternative engagement structures or methods can be used.

Lower surface 230 of center member 210 has a liquid mating surface 235 and a vent mating surface 240. Mating surfaces 235, 240, are preferably adjacent to, or incorporated into, spout 300 and air vent 345, so as to frictionally engage flow control valve 700 and place the valve in fluid communication with the spout and air vent. In the preferred embodiment, mating surfaces 235, 240 are cylindrical channels integrally molded with center member 210 below spout 300 and below air vent 345, respectively. Cylindrical channels 235, 240 have a size and shape to mate with flow control valve 700. Preferably, cylindrical channels 235, 240 have an inner size and shape to engage with flow control valve 700. Lower surface 230 can also have a valve securing member 245, which engages with a corresponding structure on flow control valve 700 to orientate and/or assist in holding the valve in position. In the preferred embodiment, valve securing member 245 is a substantially planar, arcuate member extending orthogonally from lower surface 230 of lid 200.

Flow control element or valve mechanism 700 has first valve portion or stack 730 and second valve portion or stack 732 connected together by substrate 738. Each valve portion 730, 732 has a lower portion 726, an upper portion 728 and valve faces 736 bearing slits. Each valve portion 730, 732 is configured to frictionally engage cylindrical channels 235, 240, respectively, and place flow control valve 700 in fluid communication with spout 300 and air vent 345, respectively.

Flow control element 700 preferably has a concave shaped valve face 736 of valve portions 730 and 732, and, in conjunction with the attendant curved shape of slits, provides superior fluid flow rate through the slit over existing valve configurations. U.S. Pat. No. 5,079,013 to Belanger, U.S. Pat. No. RE 37,016 to Morano, U.S. Pat. No. 6,050,445 to Manganiello and U.S. Pat. No. 6,422,415 to Manganiello depict examples of valves that are usable with the present invention. Additionally, alternative flow control mechanisms and valves can also be placed in fluid communication with spout 300 and/or air vent 345 to provide a resistance to flow or an inhibitor to spillage and shakeout, absent a sucking force, including a separate pair of stack valves that individually mate with cylindrical mating surfaces 235, 240.

Handles 400 are preferably a pair of handles that extend curvingly downward from annular flange 250 toward bottom portion 160 of cup 100. Preferably, handles 400 extend substantially down in proximity to bottom portion 160 of cup 100. Handles 400 are preferably diametrically opposed along annular flange 250. Handles 400 have a proximal end 450 where the handle is connected to flange 250, and a distal end 455. Handles 400 have a length and width that allow an infant or child to fully grasp the handles and preferably allow closure of the entire hand around the handles. Handles 400 preferably extend at least half way down cup 100. Handles 400 have a curvature and shape that provides for sufficient space between the handles and cup 100 for the hand of the infant or child when holding the handles. Preferably, handles 400 are separated from cup 100 at distal end 455 a sufficient distance to allow the infant or child's hand to pass between the distal end and the cup. The size, shape and positioning of handles 400 promote better hand-to-mouth coordination for the child or infant.

Handles 400 have a rigid portion 420, a gripping portion 460 and a gripping abutment 480. Gripping portion 460 is an area or portion of handle 400 that is more flexible, resilient and/or softer than rigid portion 420, to facilitate grasping and holding of the handle by the infant or child. In the preferred embodiment, gripping portion 460 is molded from a different material than rigid portion 420 to provide for the difference in flexibility, resiliency and softness. The different materials have different levels of hardness or Shore A Hardness. Preferably, rigid portion 420 and the remaining parts of lid 200, i.e., center member 210, annular flange 250 and spout 300, are made of the same material and more preferably are integrally molded with each other.

Rigid portion 420 is preferably molded from a rigid material, such as, for example, a polypropylene. Preferably, gripping portion 460 is molded from a flexible, resilient and/or softer material, such as, for example, a thermoplastic elastomer (TPE). The TPE of gripping portion 460 preferably has a lower hardness or Shore A Hardness than the hardness or Shore A Hardness of rigid portion 420. While the preferred embodiment has rigid portion 420 made of a first material and gripping portion 460 made of a second material, the present disclosure contemplates more than two materials, such as, for example, the rigid portion being a plurality of materials and/or the gripping portion being a plurality of materials.

Handle 400 has an upper or over-surface 402 and a lower or under-surface 404. Gripping portion 460 is preferably formed along under-surface 404 and substantially covers the under-surface. More preferably, gripping portion 460 substantially covers under-surface 404 and wraps around sides 405 of handles 400 to partially cover the over-surface 402. In the preferred embodiment, gripping portion 460 partially wraps around over-surface 402 and has ends 406, 407 with a wave-like shape, which facilitates grasping of the handles 400. The wave-like shape of ends 406, 407 further accommodates varying sizes of hands and varying positioning of hands on handles 400. Gripping abutment 480 is formed along the under-surface 404 of handle 400 near distal end 455 and further facilitates grasping of the handle. Preferably, gripping abutment 480 is a circular or semi-spherical projection.

Gripping portion 460 provides an infant or child with a different texture or feel, as compared to rigid portion 420. This provides textural stimulus for the use of handles 400. Preferably, gripping portion 460 has a different color than the color of rigid portion 420 to provide a visual stimulus for the use of handles 400. Other visual and textural stimuli can also be further provided on handles 400 to further motivate the child to utilize the handles, such as, for example, decorations or embossments. In the preferred embodiment, rigid portion 420 and gripping portion 460 are opaque. However, either or both of rigid portion 420 and gripping portion 460 can be transparent or semi-transparent. The transparency or semi-transparency of lid 100 provides for visual indication of the contents and amount within the cup, and also can encourage or promote use by a child through visual stimulation.

Referring to FIGS. 6 through 12, preferably a first material is molded, and more preferably injection molded, to form rigid portion 420 of handles 400, as well as center member 210, annular flange 250 and spout 300 of lid 200. To provide for a flow path for a second material which is more flexible, resilient and/or softer (with a lower hardness or Shore A Hardness) and to facilitate bonding of the first material of rigid portion 420 with the second material, the rigid portion preferably has an outer or first wall 425, an inner or second wall 430 and a center or third wall 435.

Outer wall 425 and inner wall 430 are substantially equidistantly spaced apart and connected by center wall 435. Preferably, center wall 435 is substantially perpendicular or orthogonal to outer and inner walls 425, 430 to define a generally U-shaped channel 440. Channels 440 are preferably formed by outer, inner and center walls 425, 430, 435 along opposing sides of rigid portion 420. The molding process for lid 200 and handles 400 is preferably a two-shot injection molding technique using a first material, such as polypropylene, for rigid portion 420, and a second material, such as TPE, for gripping portion 460.

Preferably, there is at least one rib 445 formed in channel 440. More preferably, there are two ribs 445 in each channel 440. Ribs 445 provide additional strength and integrity to handles 400. Ribs 445 are preferably formed in channels 440 in proximity to proximal end 450 of handles 400. Preferably, ribs 445 are generally parallel to outer and inner walls 425, 430 and have a shape or curvature that is similar to the shape or curvature of channel 440. The shape, size and positioning of ribs 445 preferably reduce flow resistance and further facilitate flow of the second material into and along or through the channel 440. Ribs 445 increase the surface contact area between the first and second materials, and improve the bonding between the first and second materials of rigid portion 420 and gripping portion 460.

In the preferred embodiment, outer wall 425 of rigid portion 420 has a wave-like shape so that gripping portion 460 has a corresponding wave-like shape along handles 400. To form gripping abutment 480, a semi-circular projection 485 is formed in center wall 435 along distal end 455 of the rigid portion 420. The second material is molded over the projection 485 to form gripping abutment 480. Rigid portion 420 has an end wall 490 formed in distal end 455, which provides further rigidity to handle 400, improves the bonding between the rigid portion and the gripping portion 460, and provides a terminus for the flow of the second material of the gripping portion. Preferably, end wall 490 is substantially perpendicular to outer and center walls 425, 435.

In the preferred embodiment, inner wall 430 extends only partially along handle 400. However, alternatively, inner wall 430 can fully extend along handle 400. Also, in the preferred embodiment, channels 440 are disposed on opposing sides of rigid portion 420 and run partially along the rigid portion. However, the present disclosure contemplates any number of channels 400, which may be disposed in various orientations and positions along rigid portion 420.

Figure 13:
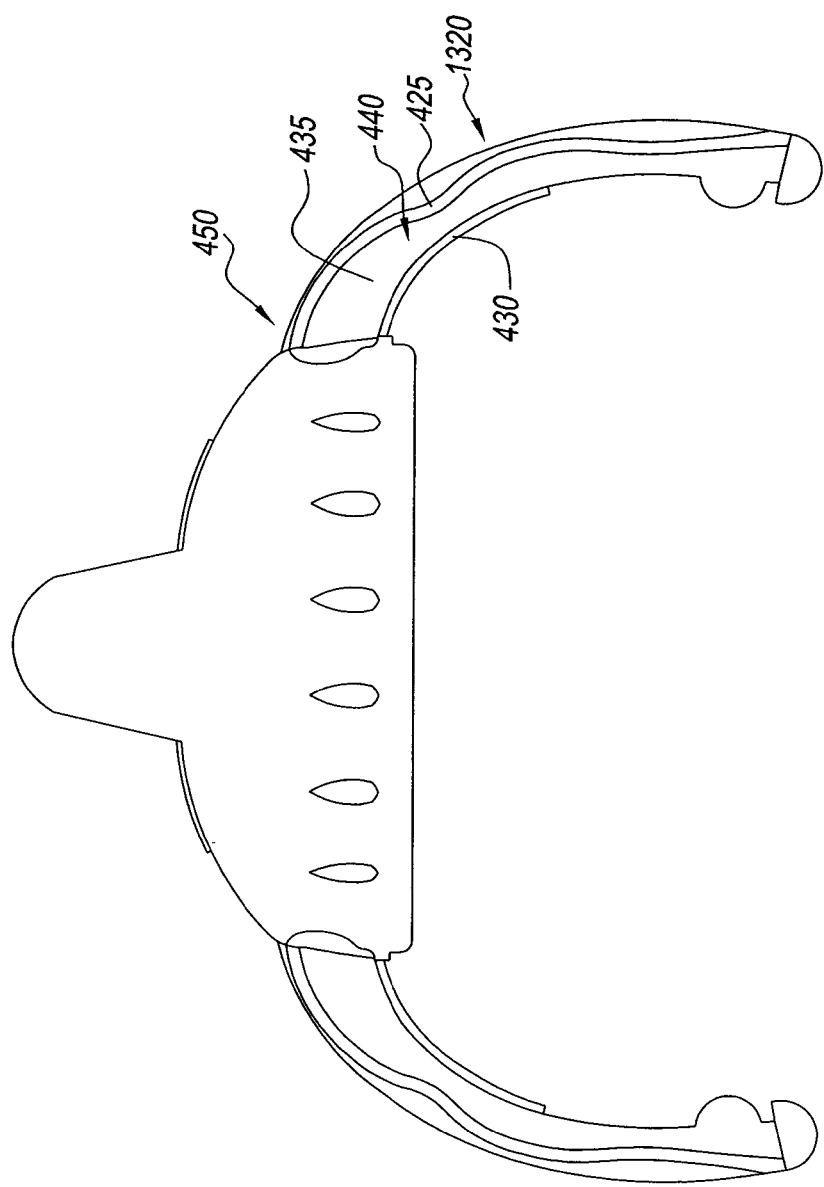
FIG. 13 is a front view of an alternative embodiment of the lid of FIG. 8 without a gripping portion.
Figure 14:
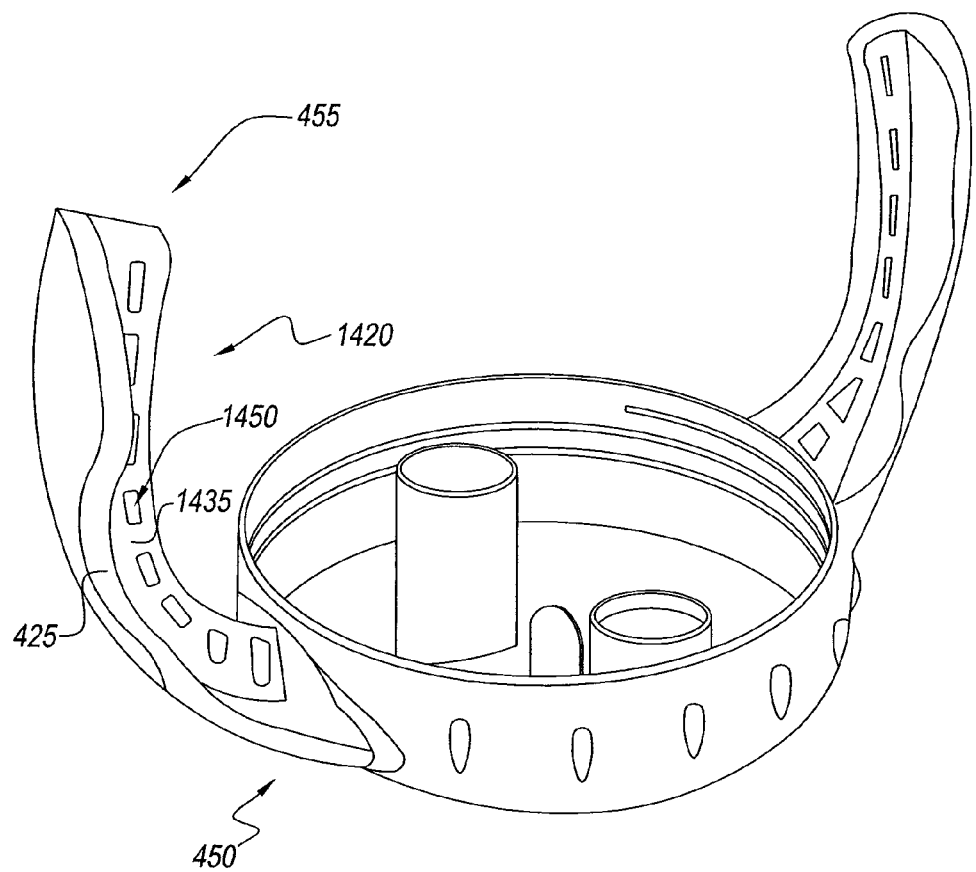
FIG. 14 is a bottom perspective view of another alternative embodiment of the lid of FIG. 8 without a gripping portion.
Figure 15:
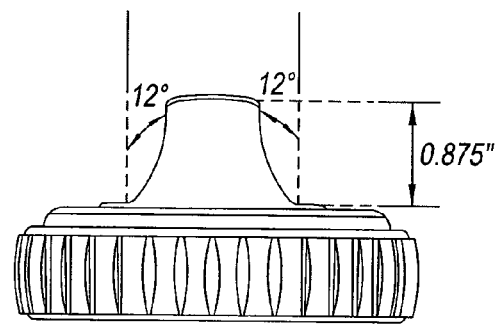
FIG. 15 is a front view of a prior art PLAYTEX® conventional lid.
Figure 16:
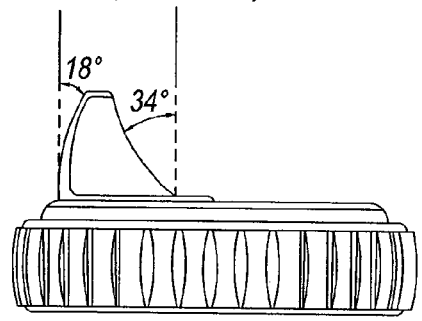
FIG. 16 is a side view of the prior art PLAYTEX® conventional lid of FIG. 15.
Figure 17:
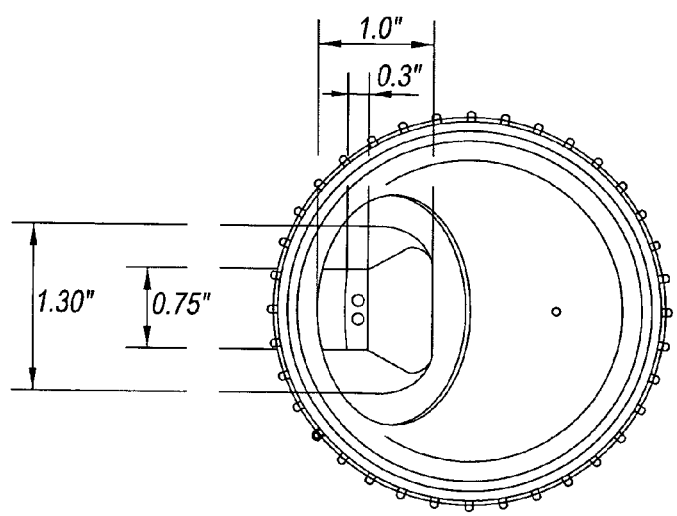
FIG. 17 is a top view of the prior art PLAYTEX® conventional lid of FIG. 15.
Figure 18:
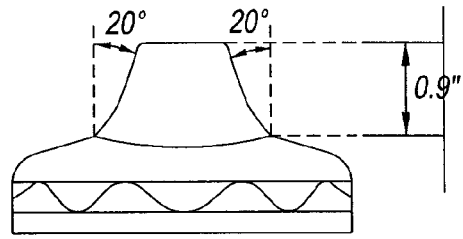
FIG. 18 is a front view of a prior art GERBER® conventional lid.
Figure 19:
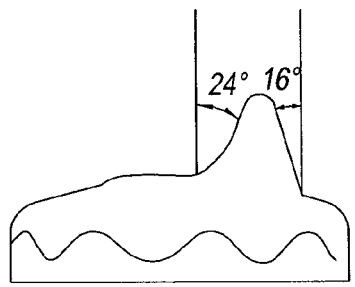
FIG. 19 is a side view of the prior art GERBER® conventional lid of FIG. 18.
Figure 20:
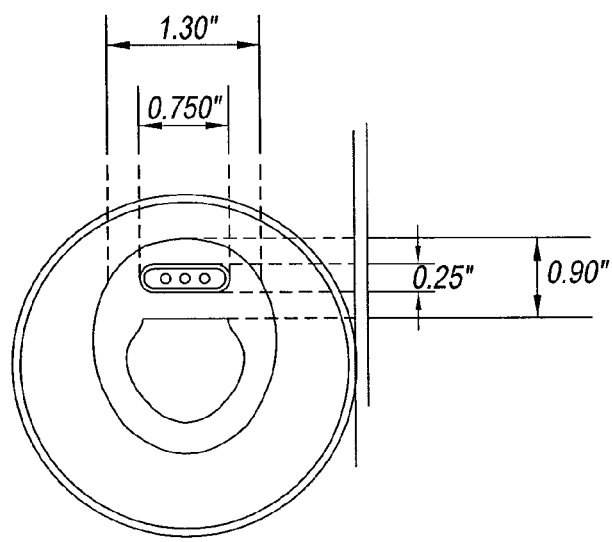
FIG. 20 is a top view of the prior art GERBER® conventional lid of FIG. 18.

Referring to FIGS. 13 and 14, alternative embodiments of lid 200 with rigid portions 1320, 1420, respectively, are shown. Features of FIGS. 13 and 14 similar to the features of the preferred embodiment of FIGS. 1 through 12, have the same reference numerals. The rigid portion 1320 of FIG. 13 has channel 440 formed by outer, inner and center walls 425, 430, 435. But the channels 440 do not have ribs disposed at proximal end 450, compared to the preferred embodiment shown in FIGS. 9 through 12.

The rigid portion 1420 of FIG. 14 has outer wall 425 formed orthogonally with a center wall 1435. But rigid portion 1420 does not have an inner wall secured to center wall 1435 and does not form a channel along rigid portion 1420, such as in the preferred embodiment. Rigid portion 1420 also does not have an end wall at distal end 455, such as in the preferred embodiment. Rigid portion 1420 has a number or series of apertures or holes 1450 formed through center wall 1435. In contrast, the center wall 435 of rigid portion 420 of the preferred embodiment, does not have apertures, and provides a generally planar solid bottom surface of channel 440 along the flow path of the second material of gripping portion 460. Apertures 1450 of rigid portion 1420 create orthogonal contact surfaces along center wall 1435 between the rigid portion and the gripping portion 460, and the second material of the gripping portion flows through the apertures.

In the preferred embodiment, handles 400 are a pair of handles integrally formed on opposing sides of lid 200 with a space provided at distal ends 455 of the handles. However, it is contemplated by the present disclosure for alternative numbers and positions of handles 400 to be used. It is further contemplated by the present disclosure for handles 400 to be integrally formed with cup 100 at bottom portion 160 of the cup to provide a separation or space from the cup in proximity to lid 100 or for the handles to be integrally formed with the cup at both the top and bottom portions 110, 160. It is also contemplated by the present disclosure for handles 400 to be a separate structure that is secured to cup 100 and/or lid 200, and/or removably secured, such as, for example, a handle ring having handles 400 extending therefrom. It is also contemplated by the present disclosure that gripping portion 460 is formed with, or secured to, rigid portion 420 in other ways, such as, for example, friction fit or adhesive.

During the molding process, an unexpected and significant result occurred with the use of ribs 445 disposed in channels 440, as compared to rigid portions 1320, and 1420 that did not have ribs. It was discovered that ribs 445 prevented sink marks from developing in gripping portion 460 when the second material was molded into and through channels 440. In rigid portions 1320, 1420, sink marks developed in the area of proximal end 450, which distorted the intended shape of gripping portion 460 and had a significant negative impact on the strength and integrity of handles 400.

Additionally, during the molding process, an unexpected and significant result occurred with the use of channels 440 and the generally planar bottom surface (center wall 435) along the flow path of the second material of gripping portion 460, as compared to rigid portion 1420, which has apertures 1450 formed through center wall 1435. It was discovered that channels 440 and the generally planar solid bottom surface of center wall 435 significantly improved the flow of the second material through channels 440, resulting in an improved bond between the rigid and gripping portions 420, 460, and further provided for a smoother outer surface of the gripping portion.

Referring to FIGS. 3 and 6 through 12, spout 300 has a front wall 310, a rear wall 320, a first side wall 330, a second side wall 340 and a top wall 350. Top wall 350 has a number of holes 360 formed therethrough. Front wall 310, rear wall 320, first and second side walls 330, 340 and top wall 350 are integrally molded, and define a spout volume 305 that is in fluid communication with inner volume 105 of cup 100 (through flow control valve 700) and with holes 360. In this embodiment, two holes 360 are shown but other numbers of holes can also be used.

Top wall 350 has an upwardly convex or arcuate shape and forms chamfered edges with front and rear walls 310, 320 and first and second side walls 330, 340. Top wall 350 has a radius of curvature $r_1$. Preferably, radius of curvature $r_1$ is from about 0.25 inches to about 0.5 inches, more preferably from about 0.35 inches to about 0.40 inches, and most preferably about 0.38 inches.

Front wall 310 has an outwardly convex shape with a radius of curvature $r_2$. Rear wall 320 has an outwardly convex shape, in the opposite direction of front wall 310, with a radius of curvature $r_3$. Preferably, radius of curvature $r_2$ is from about 3.0 inches to about 7.0 inches, more preferably from about 4.0 inches to about 6.0 inches, and most preferably about 5.0 inches. Preferably, radius of curvature $r_3$ is from about 3.0 inches to about 7.0 inches, more preferably from about 4.0 inches to about 6.0 inches, and most preferably about 5.0 inches. Preferably, radius of curvature $r_2$ and radius of curvature $r_3$ are equal. The periphery of front wall 310 and the periphery of rear wall 320 have arcuate shapes and are preferably aligned so that first sidewall 330 and second sidewall 340 are essentially chamfered edges of spout 300. Preferably, front and rear walls 310, 320 define an ellipsoidal cross-sectional shape for spout 300.

Spout 300 has a distal end 370, a proximal end 380 and a height $h_1$. Distal end 370 of spout 300 has a width $w_1$ and a depth $d_1$. Proximal end 380 of spout 300 has a width $w_2$ and a depth $d_2$. Preferably, height $h_1$ is from about 0.80 inches to about 1.80 inches, more preferably from about 1.0 inches to about 1.40 inches, and most preferably about 1.20 inches. Preferably, width $w_1$ is from about 0.50 inches to about 0.90 inches, more preferably from about 0.60 inches to about 0.70 inches, and most preferably about 0.69 inches. Preferably, width $w_2$ is from about 0.80 inches to about 1.20 inches, more preferably from about 0.90 inches to about 1.10 inches, and most preferably about 0.97 inches. Preferably, depth $d_1$ is from about 0.10 inches to about 0.25 inches, more preferably from about 0.15 inches to about 0.22 inches, and most preferably about 0.20 inches. Preferably, depth $d_2$ is from about 0.25 inches to about 0.75 inches, more preferably from about 0.40 inches to about 0.60 inches, and most preferably about 0.56 inches.

Front and rear walls 310, 320 are inwardly tapered toward distal end 370. Preferably, front and rear walls 310, 320 are inwardly tapered along a substantially straight line or constant slope. Front wall 310 has an angle of taper $\alpha_1$. Rear wall 320 has an angle of taper $\alpha_2$. Preferably, taper angle $\alpha_1$ is from about 5° to about 15°, more preferably from about 10° to about 14°, and most preferably about 13.5°. Preferably, taper angle $\alpha_2$ is from about 5° to about 15°, more preferably from about 10° to about 14°, and most preferably about 13.5°. Taper angle $\alpha_1$ and taper angle $\alpha_2$ are preferably equal.

First and second side walls 330, 340 are inwardly tapered toward distal end 370. Preferably, first and second side walls 330, 340 are inwardly tapered along a straight line or constant slope. First side wall 330 has an angle of taper $\beta_1$. Second side wall 340 has an angle of taper $\beta_2$. Preferably, taper angle $\beta_1$ is from about 5° to about 18°, more preferably from about 10° to about 15°, and most preferably about 12°. Preferably, taper angle $\beta_2$ is from about 5° to about 18°, more preferably from about 10° to about 15°, and most preferably about 12°. Taper angle $\beta_1$ and taper angle $\beta_2$ are preferably equal.

During consumer testing of cup assembly 10, unexpected and significant results occurred from the use of spout 300, as compared to the contemporary spout designs for the PLAYTEX® and GERBER® spouts shown in FIGS. 15 through 20. It was discovered that spout 300 performed significantly better with marked improvement in consumer preference and ease of use by infants, compared to both the PLAYTEX® and GERBER® spouts.

The testing included infants between the ages of six (6) months and eighteen (18) months who were provided separate cups having spout 300, the PLAYTEX® spout and the GERBER® spout, for equal periods of times. Consumer preference was tested and the use of the cups and spouts was observed by the parent(s), including the ease with which the infants were able to use the cups and spouts, and the generation of preferred flow rates.

Spout 300 rated higher than the PLAYTEX® and GERBER® spouts at %80 confidence for being easier for the infant to use. Spout 300 rated higher than the PLAYTEX® spout at %80 confidence for preference of the flow-rate achieved by the infant. Cup assembly 10 rated higher than the PLAYTEX® spout at %95 confidence for ease of drinking. These results are of statistical and practical significance.

The embodiment of spout 300 tested had a change in widths $w_1$, $w_2$ of 0.97 inches−0.69 inches=0.28 inches over a height $h_1$ of 1.20 inches, resulting in a rate of change of spout width of 0.23. In contrast, the PLAYTEX® spout had a change in widths of 1.30 inches−0.75 inches=0.55 inches over a height of 0.875 inches, resulting in a rate of change of spout width of 0.62. The GERBER® spout had a change in widths of 1.30 inches−0.75 inches=0.55 inches over a height of 0.90 inches, resulting in a rate of change of spout width of 0.61.

It was discovered based on the consumer data that the parameter of rate of change of spout width, and, in particular, a lower rate of change of widths $w_1$, $w_2$ from distal end 370 to proximal end 380 of 0.23, as compared to the rate of change for the PLAYTEX® and GERBER® spouts of 0.62 and 0.61, respectively, was a contributing cause in facilitating the use of spout 300 by the infant. In particular, the lower rate of change of widths $w_1$, $w_2$ of spout 300 promoted lip closure by the infant and facilitated generation of a suction force for achieving a preferred flow-rate.

Based on the consumer data, it was determined that the rate of change of spout widths $w_1$, $w_2$ should preferably be between about 0.10 to about 0.60, more preferably between about 0.20 to about 0.30, and most preferably be about 0.23.

Additionally, it was further discovered from the consumer data that the arcuate shape of top wall 350 with chamfered edges along the transition areas between the top wall and the front and rear walls 310, 320 and first and second side walls 330, 340, further facilitated the movement of the infant's lips along spout 300, for proper lip approximation resulting in further promotion of lip closure. In contrast, the PLAYTEX® and GERBER® spouts had substantially flat top walls with sharper edges along the transition areas between the top wall and the adjoining walls.

The embodiment of spout 300 tested had a change in depths $d_1$, $d_2$ of 0.56 inches−0.20 inches=0.36 inches over a height $h_1$ of 1.20 inches, resulting in a rate of change of spout depth of 0.30. In contrast, the PLAYTEX® spout had a change in depths of 1.00 inches−0.30 inches=0.70 inches over a height of 0.875 inches, resulting in a rate of change of spout depth of 0.80. The GERBER® spout had a change in depths of 0.90 inches−0.25 inches=0.65 inches over a height of 0.90 inches, resulting in a rate of change of spout depth of 0.72.

It was discovered from the consumer data that the parameter of rate of change of spout depth, and, in particular, a lower rate of change of depths $d_1$, $d_2$ from distal end 370 to proximal end 380 of 0.30, as compared to the rate of change for the PLAYTEX® and GERBER® spouts of 0.80 and 0.72, respectively, was a contributing cause in facilitating the use of spout 300 by an infant. In particular, the lower rate of change of depths $d_1$, $d_2$ of spout 300 promoted lip closure by the infant and facilitated generation of a suction force for achieving a preferred flow-rate.

Based on the consumer data, it was determined that the rate of change of spout depths $d_1$, $d_2$ should preferably be between about 0.10 to about 0.70, more preferably between about 0.25 to about 0.50, and most preferably be about 0.30.

Also, it was discovered from the above unexpected and significant results that the parameter of rate of change of spout cross-sectional area, and, in particular, a lower rate of change of cross-sectional area of spout 300, promoted lip closure by the infant, which facilitated generation of a suction force for achieving a preferred flow-rate. The embodiment of spout 300 tested had an ellipsoidal cross-sectional shape. The area $A_1$ for an ellipse is equal to $\Pi*a*b$, where a is the radius of the major axis and b is the radius of the minor axis.

Spout 300 has a cross-sectional area $A_1$ at distal end 370 of about $\Pi*(w_1/2)*(d_1/2)$. Spout 300 has a cross-sectional area $A_2$ at proximal end 380 of about $\Pi*(w_2/2)*(d_2/2)$. The rate of change of cross-sectional areas $A_1$, $A_2$ of spout 300 is $(\Pi*(w_1/2)*(d_1/2)-\Pi*(w_2/2)*(d_2/2))/h_1=0.27$. In contrast, the PLAYTEX® spout had spout cross-sectional areas of about 0.75 inches*0.30 inches=0.225 sq. inches at the distal end, and about 1.30 inches*1.00 inches=1.30 sq. inches at the proximal end. Over a height of 0.875 inches, the PLAYTEX® spout had a rate of change in spout cross-sectional area of about 1.229. The GERBER® spout had spout cross-sectional areas of about 0.750 inches*0.250 inches=0.1875 sq. inches at the distal end, and 1.300 inches*0.900 inches=1.170 sq. inches at the proximal end. Over a height of 0.900 inches, the GERBER® spout had a rate of change in spout cross-sectional area of about 1.092.

It was discovered from the consumer data that the lower rate of change of spout cross-sectional areas $A_1$, $A_2$ from distal end 370 to proximal end 380 of 0.27, as compared to the rate of change of spout cross-sectional areas for the PLAYTEX® and GERBER® spouts of 1.229 and 1.092, respectively, was a contributing cause in facilitating the use of spout 300 by an infant.

Based on the consumer data, it was determined that the rate of change of spout cross-sectional areas $A_1$, $A_2$ should preferably be between about 0.10 to about 1.0, more preferably between about 0.20 to about 0.50, and most preferably be about 0.27.

The embodiment of spout 300 tested had taper angles $\alpha_1$, $\alpha_2$ for front and rear walls 310, 320 of about 13.5° each, compared to corresponding overall taper angles for the PLAYTEX® spout of about 18° and 34°, and for the GERBER® spout of about 16° and 24°. It was discovered based on the consumer data that the parameter of spout taper angles and, in particular, the smaller taper angles $\alpha_1$, $\alpha_2$ for front and rear walls 310, 320, was a contributing cause in facilitating the use of spout 300 by an infant, promoting lip closure, and facilitating generation of a suction force for achieving the preferred flow-rate. The smaller taper angles $\alpha_1$, $\alpha_2$ for front and rear walls 310, 320 further facilitated the movement of the infant's lips along spout 300 for proper lip approximation resulting in further promotion of lip closure. It was further discovered that the use of a constant slope for taper angles $\alpha_1$, $\alpha_2$ for front and rear walls 310, 320, also facilitated the use of spout 300 by an infant.

Based on the consumer data, it was determined that the taper angles $\alpha_1$, $\alpha_2$ should preferably be between about 5° to about 15°, more preferably between about 10° to about 14°, and most preferably be about 13.5°.

The embodiment of spout 300 tested had taper angles $\beta_1$, $\beta_2$ for first and second side walls 330, 340 of about 12° each, compared to corresponding overall taper angles for the PLAYTEX® spout of about 12° and 12°, and for the GERBER® spout of about 20° and 20°. It was discovered from the consumer data that the parameter of side spout taper angles, and, in particular, smaller taper angles $\beta_1$, $\beta_2$ for first and second side walls 330, 340 was a contributing cause in facilitating the use of spout 300 by an infant, promoting lip closure, facilitating generation of a suction force for achieving the preferred flow-rate, and further facilitating the movement of the infant's lips along spout 300 for proper lip approximation resulting in further promotion of lip closure. It was further discovered that the use of a constant slope for taper angles $\beta_1$, $\beta_2$ for first and second side walls 330, 340, also facilitated the use of spout 300 by an infant.

Based on the consumer data, it was determined that the taper angles $\beta_1$, $\beta_2$ should preferably be between about 5° to about 18°, more preferably between about 10° to about 15°, and most preferably be about 12°.

The embodiment of spout 300 tested had front and rear walls 310, 320 that were outwardly convex to form an ellipsoidal cross-sectional shape, compared to the PLAYTEX® and GERBER® spouts which had rear walls that were concave. Additionally, front and rear walls 310, 320 had radii of curvature $r_2$, $r_3$ of 5.0 inches. It was discovered from the consumer data that the parameters of the shape of the front and rear walls 310, 320 and the radii of curvature $r_2$, $r_3$ of the front and rear walls, were contributing causes in facilitating the use of spout 300 by an infant, promoting lip closure, and facilitating generating a suction force for achieving the preferred flow-rate.

Based on the consumer data, it was determined that the radii of curvature $r_2$, $r_3$ should preferably be between about 3.0 to about 7.0, more preferably between about 4.0 to about 6.0, and most preferably be about 5.0 inches.

The shape of spout 300, including top wall 350 being arcuate; front wall 310 being outwardly convex and inwardly tapered; rear wall 320 being inwardly tapered; and first and second side walls 330, 340 being inwardly tapered at substantially equal angles providing symmetry to the spout, was determined to promote better lip approximation and lip closure for reducing liquid loss. The shape of spout 300 provides for better transitioning between bottle-feeding and cup drinking. Earlier promotion of lip closure in a child's life through the use of spout 300, assists in developing the necessary lip closure for stripping boluses from a spoon and maintaining lip closure for chewing. It was discovered based on the consumer data that various combinations of the above-described parameters were contributing factors in facilitating the use of spout 300 by an infant, promoting lip closure, and facilitating generation of a suction force for achieving the preferred flow-rate.

The present invention having been thus described with particular reference to the preferred forms thereof, it will be obvious that various changes and modifications may be made therein without departing from the spirit and scope of the present invention as defined in the appended claims.

What is claimed is:

1. A lid for a cup comprising:
   a lid body removably securable to said cup;
   an orifice; and
   a handle having a rigid portion and a gripping portion, wherein said rigid portion is formed from a first material, wherein said gripping portion is formed from a second material, wherein said first material has a higher Shore A hardness than said second material, wherein said rigid portion has an upper surface and a lower surface, and wherein said gripping portion at least partially covers said upper surface and substantially covers said lower surface, wherein said gripping portion has a first end partially covering said upper surface and a second end partially covering said upper surface, wherein at least a portion of said rigid portion is between said first and second ends along said upper surface, wherein said rigid portion has at least one rib positioned between the upper surface and the lower surface, and wherein said gripping portion covers said at least one rib, wherein said rigid portion has a first and second channel formed therein, and wherein said first end is at least partially in said first channel, and wherein said second end is at least partially in said second channel, wherein said rigid portion has first, second and third walls integrally formed with each other and at least partially defining said first and second channels, and wherein said third wall has a projection formed therein, and wherein said second material is molded over said projection to form a gripping abutment.

2. The lid of claim 1, wherein said lid body further comprises a spout, and wherein said orifice is disposed through said spout.

3. The lid of claim 1, wherein said first and second ends have wave-like shapes.

4. The lid of claim 1, wherein said first and second walls are substantially orthogonal to said third wall.

5. The lid of claim 4, wherein said first wall at least partially defines said upper surface.

6. The lid of claim 1, wherein said at least one rib is formed along said first and second channels, and wherein said rib at least one rib is substantially parallel with said first and second walls.

7. The lid of claim 6, wherein said handle has a proximal end and a distal end, and wherein said at least one rib is along said first and second channels in proximity to said proximal end.

8. The lid of claim 1, wherein said first material is a polypropylene and said second material is a thermoplastic elastomer.

9. The lid of claim 1, wherein said lid body has a vent hole formed therein.

10. The lid of claim 2, further comprising a flow control valve in fluid communication with said orifice and said spout, wherein said valve limits flow through said orifice.

11. The lid of claim 1, wherein said handle is a pair of handles extending from said lid body and diametrically opposed along said lid body.

12. A cup assembly for an infant comprising:
a cup defining an inner volume;
a lid having an orifice in fluid communication with said inner volume, said lid being removably securable to said cup; and
a handle having a rigid portion and a gripping portion, said rigid portion being formed from a first material, said gripping portion being formed from a second material, and said first and second materials being integrally molded, wherein said first material has a higher Shore A hardness than said second material, wherein said rigid portion of said handle has a channel formed therein, wherein at least a portion of said second material is in said channel, wherein said rigid portion has at least one rib in said channel, wherein said gripping portion covers said at least one rib, wherein said channel is first and second channels at least partially along said rigid portion, wherein said rigid portion has first, second and third walls integrally formed with each other and at least partially defining said first and second channels, wherein said first and second walls are substantially orthogonal to said third wall, wherein said first wall has a wave-like shape, wherein said gripping portion has a corresponding wave-like shape adjacent to said first wall, and wherein said gripping portion substantially defines said lower surface, and wherein said third wall has a projection formed therein, and wherein said second material is molded over said projection to form a gripping abutment.

13. The cup assembly of claim 12, wherein said handle has an upper surface and a lower surface, wherein said first wall of said rigid portion at least partially defines said upper surface, and wherein said gripping portion at least partially defines said lower surface.

14. The cup assembly of claim 12, wherein at least one rib is along at least one of said first and second channels, and wherein said at least one rib is substantially parallel with said first and second walls.

15. The cup assembly of claim 14, wherein said handle has a proximal end and a distal end, and wherein said at least one rib is along said channel in proximity to said proximal end of said handle.

16. The cup assembly of claim 12, wherein said first material is a polypropylene and said second material is a thermoplastic elastomer.

17. The cup assembly of claim 16, wherein said lid has a spout and said orifice is formed in said spout.

18. The cup assembly of claim 17, wherein said lid has a vent hole formed therein.

19. The cup assembly of claim 18, further comprising a flow control valve in fluid communication with said spout, said vent hole and said inner volume, wherein said valve limits flow from said inner volume through said orifice.

20. The cup assembly of claim 12, wherein said handle is a pair of handles extending from said lid and diametrically opposed along said lid.

21. A cup assembly for an infant comprising:
a cup defining an inner volume;
a lid having an orifice in fluid communication with said inner volume, said lid being removably securable to said cup; and
a handle comprising a rigid portion and a gripping portion and having a proximal end and a distal end,
wherein said rigid portion is formed from a first material, said gripping portion is formed from a second material, and said first material has a higher Shore A hardness than said second material,
wherein said proximal end is secured to said lid and said distal end is separated from said cup by a first distance when said lid is secured to said cup,
wherein said first distance is large enough to allow a hand of said infant to pass between said cup and said distal end of said handle,
wherein said rigid portion of said handle has a channel formed therein,
wherein said rigid portion has at least one rib in said channel and wherein said gripping portion covers said at least one rib,
wherein at least a portion of said second material is in said channel,
wherein said channel is first and second channels at least partially along said rigid portion, wherein said rigid portion has first, second and third walls integrally formed with each other and at least partially defining said first and second channels,
wherein said first and second walls are substantially orthogonal to said third wall,
wherein said first wall has a wave-like shape, wherein said gripping portion has a corresponding wave-like shape adjacent to said first wall, and wherein said gripping portion substantially defines said lower surface, and
wherein said third wall has a projection formed therein, and wherein said second material is molded over said projection to form a gripping abutment.

22. The cup assembly of claim 21, wherein said handle has an upper surface and a lower surface, wherein said first wall of said rigid portion at least partially defines said upper surface, and wherein said gripping portion at least partially defines said lower surface.

23. The cup assembly of claim 21, wherein said at least one rib along at least, one of said first and second channels, and wherein said at least one rib is substantially parallel with said first and second walls.

24. The cup assembly of claim 23, wherein said at least one rib is in proximity to said proximal end of said handle.

25. The cup assembly of claim 21, wherein said gripping abutment is in proximity to said distal end of said handle.

26. The cup assembly of claim 21, wherein said first material is a polypropylene and said second material is a thermoplastic elastomer.

27. The cup assembly of claim 26, wherein said lid has a spout and said orifice is formed in said spout.

28. The cup assembly of claim 27, wherein said lid has a vent hole formed therein.

29. The cup assembly of claim 28, further comprising a flow control valve in fluid communication with said orifice, said vent hole and said inner volume, wherein said valve limits flow from said inner volume through said orifice.

30. The cup assembly of claim 21, wherein said handle is a pair of handles extending from said lid and diametrically opposed along said lid.

31. A cup assembly comprising:
a cup defining an inner volume; and
a lid having a spout, an orifice and a handle, said orifice being disposed through said spout, said handle having a rigid portion and a gripping portion, and said rigid portion having a channel,
wherein said rigid portion is formed from at least a first material, said gripping portion is formed from at least a second material, and said first material has a higher Shore A Hardness than said second material,
wherein a first portion of said second material is disposed in said channel and a second portion of said second material is disposed adjacent to said channel,
wherein said rigid portion has at least one rib in said channel,
wherein said gripping portion covers said at least one rib,
wherein said rigid portion has first, second and third walls integrally formed with each other and at least partially defining said channel,
wherein said at least one rib is along said channel, and wherein said at least one rib is substantially parallel with said first and second walls,
wherein said handle has a proximal end and a distal end, and wherein said at least one rib is in proximity to said proximal end of said handle, and
wherein said third wall has a projection formed therein, and wherein said second material is molded over said projection to form a gripping abutment.

32. The cup assembly of claim 31, wherein further comprising a third portion of said second material that is above said channel and adjacent to said second portion of said second material.

33. The cup assembly of claim 31, wherein said first and second walls are substantially orthogonal to said third wall.

34. The cup assembly of claim 31, wherein said handle has an upper surface and a lower surface, wherein said first wall of said rigid portion at least partially defines said upper surface, and wherein said gripping portion at least partially defines said lower surface.

35. The cup assembly of claim 34, wherein said first wall has a wave-like shape, wherein said gripping portion has a corresponding wave-like shape adjacent to said first wall, and wherein said gripping portion substantially defines said lower surface.

36. The cup assembly of claim 31, wherein said gripping abutment is in proximity to said distal end of said handle.

37. The cup assembly of claim 31, wherein said first material is a polypropylene and said second material is a thermoplastic elastomer.

38. The cup assembly of claim 31, wherein said lid has a vent hole formed therein.

39. The cup assembly of claim 38, further comprising a flow control valve in fluid communication with said orifice, said vent hole and said inner volume, wherein said valve limits flow from said inner volume through said orifice.

40. The cup assembly of claim 31, wherein said handle is a pair of handles extending from said lid and diametrically opposed along said lid.

41. A method of making the lid of claim 1 comprising:
molding said rigid portion, said lid body, and said spout, from said first material; and
molding said gripping portion from said second material.

42. The method of claim 41, wherein molding said gripping portion comprises disposing a second portion of said second material adjacent to said channel.

43. The method of claim 41, wherein molding said rigid portion of said lid comprises integrally forming said first wall, said second wall and said third wall, and wherein said third wall connects said first and second walls.

44. The method of claim 43, wherein said third wall is substantially orthogonal to said first and second walls.

45. The method of claim 41, wherein said first material is a polypropylene and said second material is a thermoplastic elastomer.

46. The method of claim 43, wherein molding said rigid portion further comprises forming a substantially planar bottom surface along said first channel.

47. The method of claim 43, wherein the rib has a top surface and a bottom surface, and wherein said gripping portion covers said top surface and bottom surface of said at least one rib.

48. A method of making the handle of claim 1 comprising:
molding said rigid portion of said handle from said first material; and
molding said gripping portion of said handle from said second material,
wherein said rigid portion has said at least one rib in said first channel.

49. The method of claim 48, wherein molding said gripping portion of said handle comprises disposing a portion of said second material adjacent to said channel.

50. The method of claim 48, wherein molding said rigid portion of said handle comprises integrally forming said first wall, said second wall and said third wall, wherein said third wall connects said first and second walls.

51. The method of claim 50, wherein said third wall is substantially orthogonal to said first and second walls.

52. The method of claim 48, wherein said first material is a polypropylene and said second material is a thermoplastic elastomer.

53. The method of claim 48, wherein molding said rigid portion of said handle further comprises forming a substantially planar bottom surface along said first channel.

54. A method of making the cup assembly of claim 12 comprising:
   molding said rigid portion of said handle from said first material; and
   molding said gripping portion of said handle from said second material.

55. A method of making the cup assembly of claim 12 comprising:
   molding said rigid portion and said lid from said first material; and
   molding said gripping portion from the second material.

56. A method of making the cup assembly of claim 21 comprising:
   molding said rigid portion of said handle from said first material; and
   molding said gripping portion of said handle from said second material.

57. A method of making the cup assembly of claim 21 comprising:
   molding said rigid portion and said lid from said first material; and
   molding said gripping portion from the second material.

58. A method of making the cup assembly of claim 31 comprising:
   molding said rigid portion of said handle from said first material; and
   molding said gripping portion of said handle from said second material.

* * * * *